US006516190B1

(12) United States Patent
Linkola

(10) Patent No.: US 6,516,190 B1
(45) Date of Patent: Feb. 4, 2003

(54) METHOD AND APPARATUS FOR CALCULATING CALL CHARGE RATES IN A MOBILE TELECOMMUNICATION SYSTEM

(75) Inventor: Janne Linkola, Helsinki (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/466,497

(22) Filed: Dec. 17, 1999

(30) Foreign Application Priority Data

Jun. 17, 1997 (FI) ................................................. 972591
Jun. 15, 1998 (WO) ................................. PCT/FI98/00515

(51) Int. Cl.$^7$ ............................................ H04M 15/00
(52) U.S. Cl. ...................................... 455/408; 455/456
(58) Field of Search ................................ 455/405–408, 455/456

(56) References Cited

U.S. PATENT DOCUMENTS

| | | | | |
|---|---|---|---|---|
| 5,295,180 A | * | 3/1994 | Vendetti et al. | ............. 455/456 |
| 5,546,445 A | | 8/1996 | Dennison et al. | |
| 5,774,802 A | * | 6/1998 | Tell et al. | .................... 455/408 |
| 6,044,261 A | * | 3/2000 | Kazmi | ......................... 455/408 |

FOREIGN PATENT DOCUMENTS

| | | |
|---|---|---|
| EP | 0 568 824 A2 | 11/1993 |
| EP | 0734144 A2 | 9/1996 |
| WO | WO94/28670 | 12/1994 |
| WO | WO96/20570 | 7/1996 |
| WO | WO96/20571 | 7/1996 |
| WO | WO96/34499 | 10/1996 |
| WO | WO97/08884 | 3/1997 |
| WO | WO97/11569 | 3/1997 |

* cited by examiner

*Primary Examiner*—Nguyen T. Vo
(74) *Attorney, Agent, or Firm*—Cohen, Pontani, Lieberman & Pavane

(57) ABSTRACT

Rate charging rules and principles concerning mobile calls in a cellular communication system can be improved by providing the mobile station with a locator object which, at certain intervals, determines the cell in which the mobile station is currently located. Stored in the mobile station is a list of cells or areas in which a special rate is to be applied in charging for calls originating from the mobile station. The locator object monitors calls made from the mobile station and, when it detects that a call is being made, it determines whether the mobile station was in a denoted special rate area at the time that its location was most recently determined. If so, then the object informs the network that the call is entitled to the special rate. Since the last location function was executed just before call setup commenced, a special rate call is possible even if the mobile station has thereafter moved some distance into a cell applying a normal rate. Disposed in a billing center is a billing object, to which the locator object sends data indicating whether the call was initiated from a cell or area in which a special rate is applicable, as well as data identifying the particular call. The second object receives the billing records generated by the mobile switching center, which also contain call identifying data, and compares the call-specific data in those records with the data sent by the first object. In this way, the second object can identify from the billing records those calls that are entitled to a special rate, regardless of whether the mobile station has moved during call setup from the original cell into a cell where another rate, e.g. a higher rate, is applicable.

19 Claims, 4 Drawing Sheets

METHOD AND APPARATUS FOR CALCULATING CALL CHARGE RATES IN A MOBILE TELECOMMUNICATION SYSTEM

BACKGROUND OF THE INVENTION

1. Field of the Invention

The present invention relates to the calculation of charges for calls made from a mobile communications device in a cellular mobile communication system.

2. Description of the Related Art

In a wired network, the charge assessed for a call depends on whether the call is a local call, a trunk call or an international call—i.e. a geographically defined call—or is, on the other hand, a call to a service number. Thus, when dialing the number of a called subscriber, the calling subscriber already knows the principles or basis on which the cost or price of the call will be calculated.

The rules or principles used in a wired network for calculating the call price cannot be directly applied in mobile telephone networks. This is because the mobile subscriber is not tied to a given locality, whereas the called subscriber may be a locality-dependent wired network subscriber, or a mobile subscriber in the same mobile communication network, or a mobile subscriber in another operator's mobile communication network. Within the mobile communication network, no distinction is made between local and long-distance calls in respect of pricing; moreover, in contrast to the wired network, the called subscriber may in some cases or systems be required to pay a portion of the price of a received call.

In mobile communication networks, a difficulty in locality-dependent determination of call pricing is that the exact locality of neither the calling subscriber nor the called subscriber is known. To provide an understanding of the principles by which call pricing is calculated, the call setup process in a mobile communication network will now be described in general outline form by reference to FIG. 1.

When a calling subscriber in cell a1 within location area 1 under mobile switching center MSC1 initiates a call to a subscriber in location area 2 under another mobile switching center MSC2, he or she will dial the MSISDN (Mobile Subscriber International ISDN) number of the called subscriber on his or her mobile station MS-A, which sends it in a message to the base transceiver station 1 (step 1). Upon receiving the message, MSC1 determines whether the request can be accepted. As a part of this determination, the subscriber data of the calling subscriber are retrieved from the visitor location register VLR1 associated with MSC1 at which they have been stored in conjunction with the standard location updating procedure. If the request is accepted, the mobile switching center MSC1 will send to the home location register HLR an enquiry containing the called subscriber's MSISDN number (step 2). Based on that number, the HLR retrieves the data for the called subscriber, which indicates that the called subscriber has roamed to visitor location register VLR2. Next, the HLR sends the IMSI (International Mobile Subscriber Identity) data to visitor location register VLR2, asking the latter to provide it with the roaming number (step 3), whereupon VLR2 sends the roaming number MSRN (Mobile Subscriber Roaming Number) to the home location register HLR (step 4), from which it is further sent to MSC1 (step 5).

After this, the call can be routed from mobile switching center MSC1 to mobile switching center MSC2 on the basis of the MSRN received from VLR2 (step 6). Upon receipt of the start message, the mobile switching center MSC2 of the called subscriber retrieves the subscriber data for the called subscriber from the associated VLR2. From that subscriber data, MSC2 learns the location area LAI-2 of the called subscriber, so that MSC2 is able to send a paging message tot he called subscriber's mobile station via the appropriate base station controller 2 (step 7) for the cells b1, b2, b3 of the location area in question. After the called subscriber's mobile station MS-B has responded to the paging message, the call to the called subscriber is finally set up. From the foregoing, it will be apparent that only after the called subscriber's mobile station has responded to the paging message is the relevant mobile switching center MSC2 informed of the called subscriber's current cell level location.

The mobile switching center may also be linked to a service switching point SSP of an intelligent network IN to allow connections from the mobile communication network to the intelligent network. Through an intelligent network, a wide variety of services can be offered to the subscribers of the mobile communication network, including services such as "follow-me" call diversion, call rerouting distribution, premium rate call pricing, etc.

In a state-of-the-art mobile communication network, the most basic rule of call charging is that the calling subscriber is charged for the connection between him or her and the home network of the called subscriber, while the called subscriber is charged for the connection between his or her current locality and his or her home network.

To increase flexibility in connection with the application and assignment of billing rules and principles, a known method is to set a special billing parameter that allows calls made from the subscriber number associated with the parameter to be billed at a lower rate than normal at times when the load on the mobile communication network is low and, correspondingly at a higher rate when the load on the mobile communication network is high. This parameter thus creates a time-dependent call charging principle, but in other respects the pricing of calls follows the above-mentioned principles.

Another known practice is to charge a lower price for calls between a mobile station and a specified wired network telephone than for normal calls. The latter can be implemented by assigning for all subscribers to the service a common service number, e.g. 020100, as the called subscriber number which directs the call to an intelligent network. In the intelligent network, a service program searches a database to find the called subscriber number that is associated with the calling subscriber number, and the call is then automatically routed to the database-stored number.

A comparison of the principles of call price calculation used in mobile communication networks with those used in wired networks reveals certain problems. Since all cells are the same as concerns call charging within to the mobile communication network, it is difficult to offer various user groups any other principles of call price calculation than, for example, the aforesaid price variations based on time-of-day. At present, there are no special call price calculation principles applicable to calls within the same cell or to calls between specific cells. However, it would be attractive for a mobile telephone network operator to be able to provide various services dependent on the locality from which the call originates and/or where it terminates. Such services may for example include locality-dependent pricing schemes.

Patent specifications WO-96/20570 and WO-96/20571 disclose solutions for determining the principles of call price calculation. The price calculation principles can for example be improved by identifying a specified or predetermined cell or number of cells of a mobile telephone network as a special cell group. During call setup, the mobile switching center or a service control point SCP in an intelligent network analyses the call to determine whether the cell in whose area the calling subscriber is located and/or the cell in whose area the called subscriber is located belong(s) to the group of such "special" cells. When the calling and called subscribers are located in cells belonging to different switching centers, data regarding the cell of the called subscriber is transmitted to the switching center of the calling subscriber, or to an intelligent network, before a voice connection is established. In this way it is possible to vary the call charging rates to be applied on the basis of whether the subscribers are or are not located in a group of these special cells.

Patent specification WO-96/34499 describes a system in which the subscribers are divided into normal subscribers and "fixed" subscribers. A normal subscriber may start a call in any cell, whereas a fixed subscriber has only limited access to the network from a subscriber area comprising one or more predetermined cells. When a fixed subscriber is at the boundary of his or her area, the call is forcibly directed to the base transceiver station of the subscriber area, if possible.

These prior art solutions allow the application of more fine-grained call charging principles than those generally used. A feature common to these solutions is that the right to a differently priced call is determined by reference to the cell in whose area the subscriber is physically located at the time of the call, i.e. according to the base transceiver station that connects the subscriber to the network. This aspect of these solutions results from the fact that the metering record generated at the start of the call includes, among other data, an identifier of the base transceiver station via which the connection is set up, and the base station identifier in turn reveals whether the base station belongs to a group of special cells. In other words, the base station identifier functions as a factor that ultimately determines the price of the call.

However there is a problem associated with these prior-art solutions. In most mobile telephone systems, it is the network that makes the decision as to which base station is to be used to transmit the subscriber's calls. When the subscriber is in the fringe area of a cell in which a lower call charge is applicable, the network may repeatedly instruct the mobile station to perform a handover between two base stations, which means that the calling end of the connection alternates between the base station of a "less costly" cell and the base station of an adjacent (and more expensive) cell. If the adjacent cell is not one of the cells where a lower call charge is applicable, then the call price will vary during the same call as the connection is repeatedly handed over from one base station to another, the call charge being thus lower at one moment and higher at the next, without the subscriber having any opportunity to influence the situation in any way.

One proposed solution to this problem is to assign to the mobile station some of the handover control functions between base stations. In the idle state, the mobile station would remain for as long as possible in signaling contact with a cell applying a lower call charge when in the fringe area of the cell; in other words, the mobile station would remain "hanging" in the cell even when a neighboring cell would provide a better quality or more reliable connection. During a communication connection, too, the mobile station would continue hanging in the old cell when in the area of another cell, and it would inform the network—e.g. in conjunction with a change of base station or the call setup procedure—that it gives preference to the old base station which provides less costly service over or instead of other base stations.

This proposed solution, however, exhibits the drawback of increased co-channel interference which arises because, when the communication connection is forcibly maintained via the base station of a less expensive cell although the mobile station is located in the area of an adjacent (but more expensive) cell that would provide a better connection, the mobile station has to use a higher transmission power to compensate for the signal attenuation caused by the longer transmission distance. As a consequence, the mobile telephone causes interference with other mobile stations using the same frequency and that are communicating at the reuse distance of this frequency. Another drawback is that changes need to be made in certain network components, such as the base station controller and the telephone itself, to implement it; specifically, changes must be made in at least the handover criteria and controlling algorithm.

Another solution proposed to deal with this problem is to have information presented on the display of the mobile station in its idle state to indicate the particular cell in whose area the mobile station is currently located. The idea is to thereby provide the subscriber with information that he or she can use as a basis for intentionally moving into the area of a cell with a lower call charge when the subscriber is at or near the boundary between cells. A drawback of this solution, however, is that because the billing record is generated at the beginning of the call when the telephone is already in the active state, the subscriber may unintendedly move on to the area of a cell with a higher call charge rate during the call setup procedure based on the information seen on the display before transmission of the call setup request that the mobile station is still located in the area of a less costly cell.

It is therefore the object of the present invention to achieve a system that is free of these drawbacks of prior art systems and that does not result in co-channel interference. In such a system, determination of the location of a mobile station should be implemented in a manner that allows a call started from a "special" cell to continue being charged at the rate applicable to that cell even if the mobile station should move on to a cell with a normal or increased charging rate during call setup. A further object is to ensure that, even if call setup is initiated in a cell with a normal charging rate but a time interval earlier the mobile station had been in a special cell, the call can still be charged at the rate applicable to the special cell. The length of time of the time interval should also be adjustable.

Yet another object of the invention is to provide a system in which the area of a specially priced call is not dependent on the cell coverage area but may instead consist of any geographic area; such an area may even consist of a portion of one cell and a portion of another cell. Location of the mobile station should therefore be independent of the information transmitted by the base stations.

SUMMARY OF THE INVENTION

In accordance with the invention, the mobile station is provided with a first object, i.e. a locator object, which determines the location of the mobile station. The location function can be carried out to resolve to the accuracy of a cell or to a sub-area of a cell, making use of the existing properties of the mobile communication system. By utilizing location methods external to the mobile telephone system, completely cell-independent location can be achieved. The location function is executed at certain predetermined intervals. The mobile station also contains a stored list of cells and/or areas in which a special charging rate is applicable. The locator object monitors the calls originating from the mobile station and, when it detects the start of a call, it determines whether the mobile station was in a cell or area with a special charging rate at the time at which the location function was last executed. If so, then the object will inform the network that the call is entitled to a special rate. Because the last location function has been executed before the commencement of call setup, charging of the call at a special rate is possible even if the mobile station has subsequently moved some distance into the area of a cell applying a normal rate. Channel allocation is carried out independently of location in accordance with the normal procedures in the system, which means that co-channel interference is avoided.

One of the network elements is provided with a second object, i.e. a billing object, to which the first object sends information indicating whether the call has been started from a cell or area in which a special rate is applicable. The second object receives the billing records generated by the mobile switching center and compares the call-specific data in those records with the data sent by the first object. In this way, the second object can identify in the billing records those calls that are entitled to a special rate, even if the mobile station has moved during call setup from the original cell or area into a cell in which another charging rate, e.g. a higher rate, is applicable.

Cells allowing the application of a special rate can be divided into groups of cells or areas, and each of the groups may have a different rate applicable in that group. Thus, when the final telephone bill is being compiled, the rate applicable in the special rate group can be checked and the call charges determined accordingly.

The locator object may send to the network the data concerning a call entitled to a special rate either during the call or, alternatively, it may collect such data for a desired length of time and send the data all at once to the billing object. However, the latter method leads to increased difficulty in generating the telephone bill if the data are received after the call records received during the billing period have been subjected to post-processing.

Other objects and features of the present invention will become apparent from the following detailed description considered in conjunction with the accompanying drawings. It is to be understood, however, that the drawings are designed solely for purposes of illustration and not as a definition of the limits of the invention, for which, reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several figures.

DETAILED DESCRIPTION OF THE PRESENTLY PREFERRED EMBODIMENTS

Figure 2:
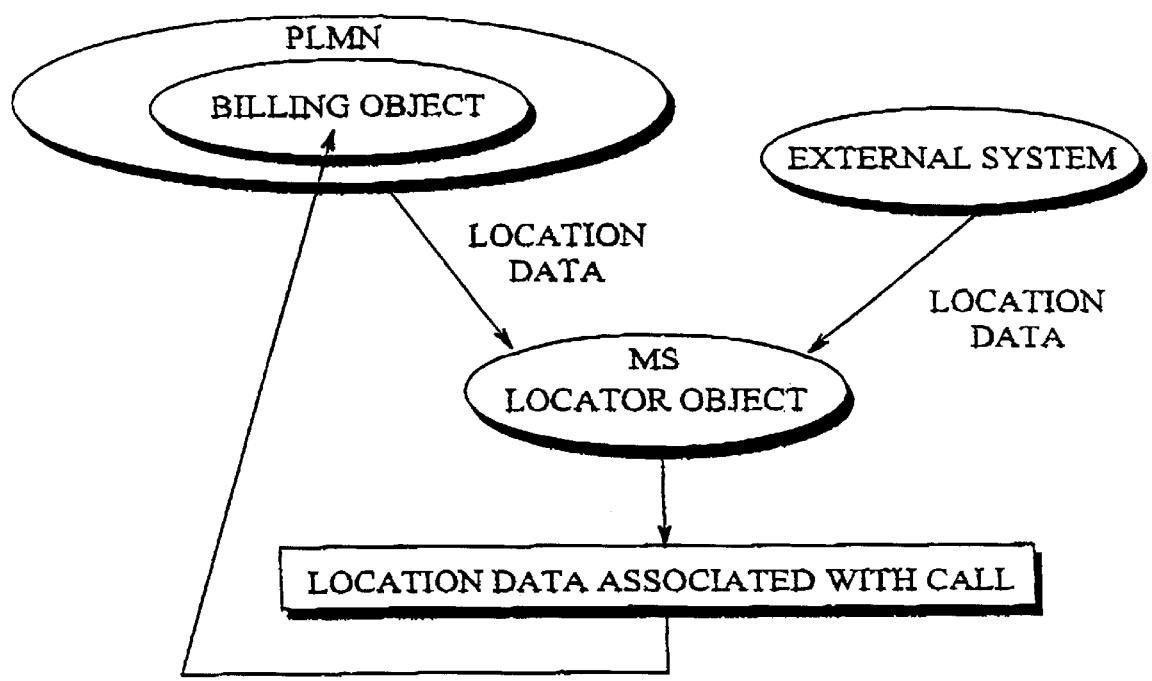
FIG. 2 schematically illustrates the principle of the present invention in simplified form.

FIG. 2 illustrates, in simplified form, the principle and concept of the present invention. A mobile telephone system PLMN (Public Land Mobile Network) 22 is provided with a billing object. The billing object is located in or at a network element at which call data are collected in a centralized manner for billing purposes; a natural place for the billing element is therefore the billing center, to which the mobile switching centers send their call data records. Installed in the mobile station, i.e. a mobile telephone MS, is a locator object 21 whose function is to establish or determine the current location of the mobile station and to send the location data to the billing object 22.

The locator object receives the information required for the determination of location in two ways—either from the mobile telephone network PLMN or from an external system.

The first method is based on the fact that the base stations in all known mobile telephone networks transmit information about themselves in a signal that, depending on the system, can by way of example be called a beacon signal, broadcast signal, pilot signal, or other corresponding designation. Using this signal, the locator object can easily determine its current location to at least the accuracy of a single cell. In some countries, the regulations by authorities stipulate that mobile stations be capable of location determination with an accuracy beyond the level of the cell coverage area. To meet this requirement, several different methods have been proposed, such as those based on a timing advance in which the network measures timing advance values between each of several base stations and the mobile station; since the timing advance between the mobile station and each base station is directly proportional to the distance therebetween, three timing advance values are sufficient to produce coordinates defining the current location of the mobile station with reasonable accuracy. If the PLMN network computes the location data, then these data are transmitted to the locator object.

In the second method for locator object identification of mobile station position, the mobile station determines its location in a manner independent of the PLMN network by using some external system. Such a system may be, for example, the existing GPS (Global Positioning System) satellite location system. In this case, the locator object may contain a GPS receiver.

In either event, in both methods the determined current location data is transmitted during or after the call to the billing object which uses it as a basis for calculating the charge for the call.

Figure 1:
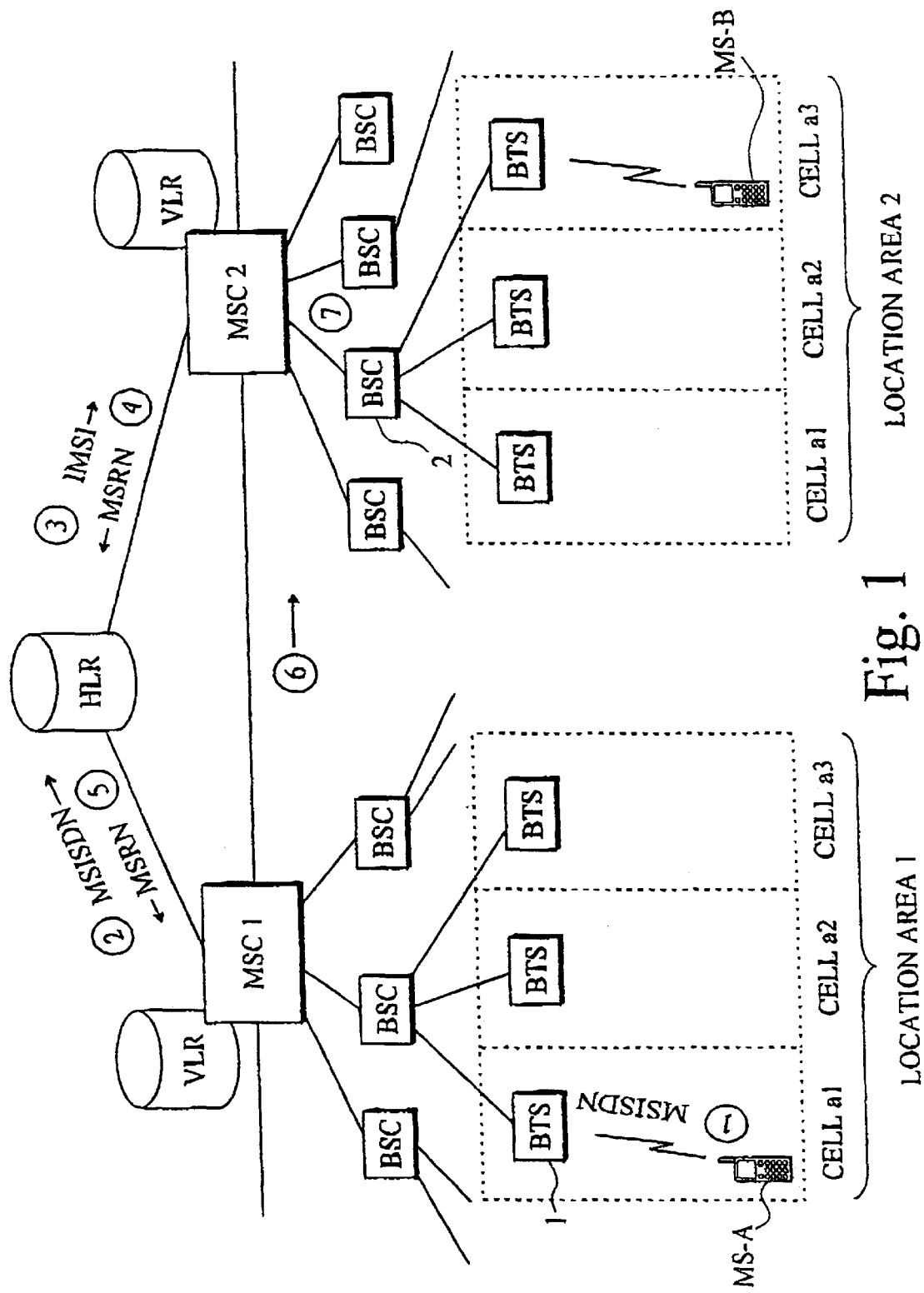
FIG. 1 schematically depicts the process of call setup in a mobile telephone network.
Figure 3:
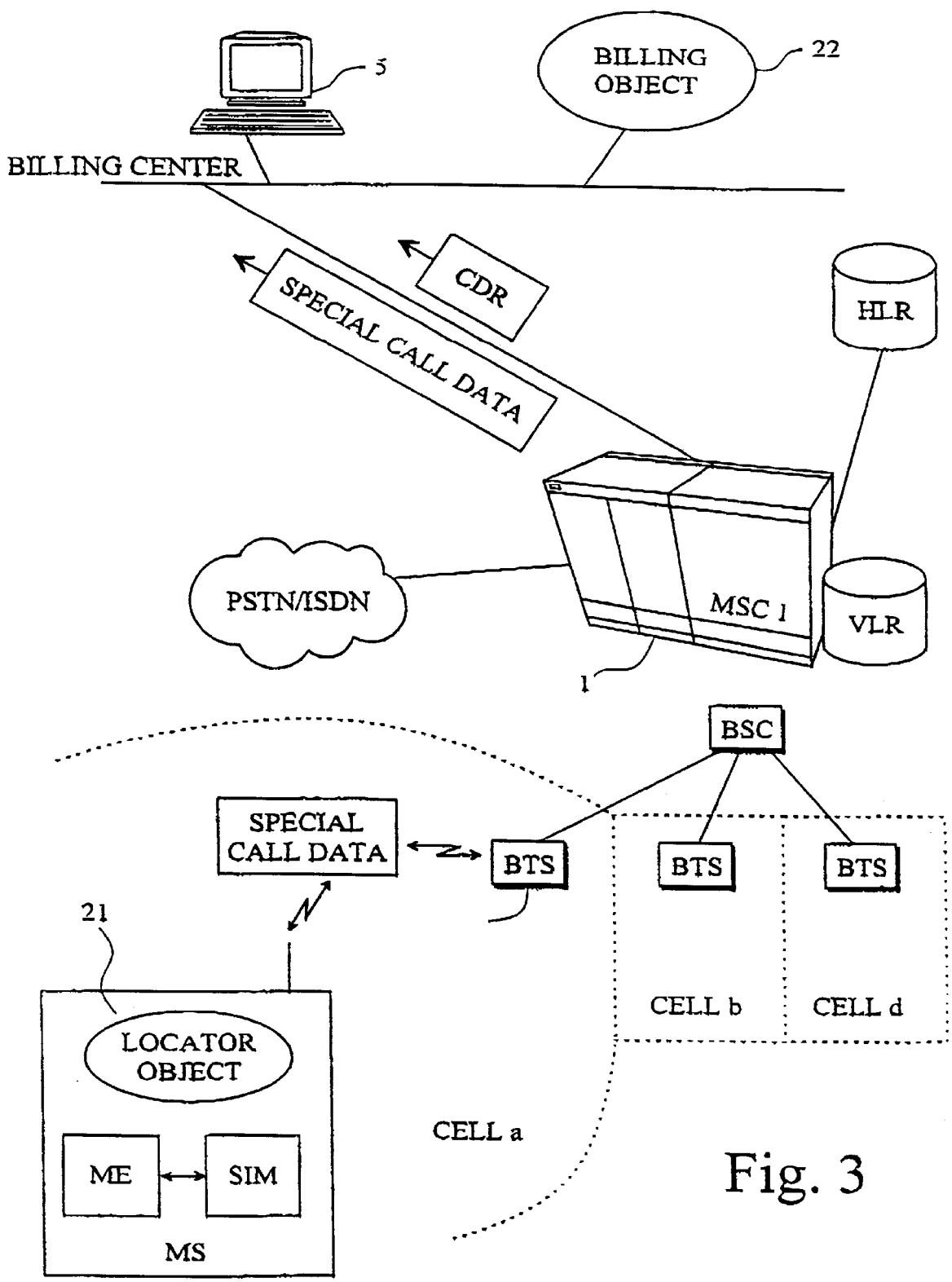
FIG. 3 schematically illustrates a mobile telephone network utilizing or incorporating the present invention.

FIG. 3, which also incorporates the elements of the mobile system and of the invention depicted in and described hereinabove in conjunction with FIGS. 1 and 2, can be utilized to indicate the manner in which the invention may be implemented using a conventional GSM system modified to operate in accordance with the present invention. In current GSM systems, when a mobile station MS initiates a call, the mobile switching center MSC generates a call data record CDR in which a desired amount of information relating to the call is stored. Usually this information comprises at least the call start time, the call termination time, the calling and called numbers, and a cell identifier Cell ID. The mobile switching center MSC transmits a large number of CDR records at a time to the billing center, where a billing program post-processes the call data records and generates the bills to be sent to the subscribers.

In the GSM system, as in other modem systems, the mobile station MS actually consists of two parts—the mobile equipment ME and a SIM card (Subscriber Identity Module)—so that a workable mobile station MS is only obtained by inserting a SIM card into the mobile equipment ME. The SIM card can by way of example be used as a storage medium for storing telephone numbers, but is above all used for subscriber authentication. Identification based on the SIM card inserted by the user into the mobile station MS is designed to prevent illicit use of, e.g., stolen equipment and to ensure that only subscribers who pay their bills can use the network. Stored on the card are a user identifier, i.e. a PIN (Personal Identity Number) code, a subscriber identity code IMSI for use in the network, an identification algorithm A3 for use in the authentication process, and a subscriber-specific identification key $K_i$.

In accordance with the invention, the mobile station MS is provided with a new function, which in the context of this embodiment is designated as the locator object. The function of the locator object is to establish whether the mobile station is in an area in which the charging rate to be applied to calls originated from that area are different from the charging rate to be applied to calls made from other areas. Usually, the charging rate of the "special" cell or area is lower than the rate for other cells or areas. For this purpose, the locator object needs to know—i.e. be able to establish— the current location of the mobile station and, to determine the location, the broadcast information sent by the base transceiver stations is utilized. The base transceiver stations continuously or repeatedly transmit information about themselves and their environment in their broadcast control channel. This information includes a cell identity code CI, information about adjacent cells, and a location area identifier LAI. In accordance with the system specification, in its idle state the mobile station performs frequency measurements on the BCCH (Broadcast Control Channel) channels. Using a certain number of BCCH signals, e.g. six signals of highest strength, the mobile station decodes the BCCH data block, from which it obtains the BSIC data (Base Transceiver Station Color Code). Each signal contains a cell identity code CI. The cell identity code and the carrier frequency form a pair that is individual to each base transceiver station. The particular one of the base transceiver stations that sends the BCCH frequency with the highest signal strength is regarded by the mobile station as its "own" base station. If and when the mobile station MS detects upon a change of base transceiver station BTS that the location area identifier LAI has changed, it will send a location update request to the network.

Instead of the actual cell identity code CI, the location data used may consist of almost any unambiguous code obtained from the BSIC and updated at (for example) ½ second intervals to allow identification of the network cell or cell area. Such codes may include the components of the worldwide CGI (Cell Global Identification) identifier which, according to GSM specifications, comprise a Mobile Country Code MCC, a Mobile Network Code MNC, a Location Area Identifier LAI, and the aforementioned Cell Identity code CI.

From this data, a desired item can be selected for use as the location data to be monitored by the locator object, so that the area in which calls will be billed at a special charging rate can be defined as the entire network of the operator, as a particular location area, or as a predetermined group of one or more cells.

The locator object picks the location data recorded by the mobile equipment and stores it in memory. The picking frequency may be the same as the frequency at which the identifiers are decoded, but since the mobile station cannot move very far in half a second, it is preferable (and certainly satisfactory) to use a lower picking frequency; a suitable frequency is about once a minute. This length of time is such that the mobile station may start a call setup process in one cell (whose base station identifier it has received and decoded), but the call setup process may be terminated in another cell (whose base station identifier is subsequently received and decoded and placed in the call data record to be generated).

Stored in the memory of the locator object is a list or database of location data for cells permitting or associated with special call charging rates. The locator object compares the decoded location data that it has picked with the stored data and, if the decoded location data is found in the stored data, then the object may give a command to display the data on the mobile station equipment display. Thus, the mobile station may display the cell identity code per se or an explanatory text message stating, by way of illustrative example, "special cell" or the like to indicate to the user that calls made in the current location area are billed at a less costly rate, or any other suitable indication of the same. A failure to find the decoded location data in the stored data denotes that calls in that location area are charged at normal rates, so that there is no need to display any special notification or information. Accordingly, in this implementation of the invention a list of "special" cells has been stored in the memory of the locator object and the locator object compares the located cell identity code with the identifiers in the stored list and, when this comparison identifies a match, an appropriate message or indication is shown on the mobile station display.

When the locator object detects that the user is entering a telephone number and that the most recent location check indicates that the mobile station is currently (or, at least, was at the time of that check) in an area in which a special charging rate is applicable, it creates a record of the call data record type, here designated as a compensation record. The compensation record contains the location data either as such or, preferably, in the form of a suitable code. The compensation record further includes at least the calling subscriber and called subscriber numbers.

With continued reference to FIG. 3, the locator object transmits the compensation record to the billing object 22 in the network in a special call data message. The billing object is typically located in the billing center. The compensation record may be transmitted either during or after the call. The locator object may also collect compensation records for a longer time period and then send the collected compensation records periodically in bulk to the billing object. The billing object gathers the call data records sent by the mobile switching center and the compensation records sent by the locator object and locates in the gathered call data records those that are entitled to a different (e.g. lower) call charge even if the cell identity code in the call data record indicates that the call is a normal rate call or proceeded in a normal rate cell.

The locator object may, in accordance with the invention, be implemented in the following manner.

In the so-called Phase 2+ of the follow-up specification of the GSM system by ETSI (the European Telecommunications Standards Institute), the functions of the SIM card have been considerably increased as compared with the original GSM system specifications. The new definitions are presented in detail in specification GSM 11.14 "Digital cellular communications system (Phase 2+): Specification of the SIM Application Toolkit for the Subscriber Identity Module-Mobile Equipment (SIN-ME) Interface". These new specifications define mechanisms that allow applications on the SIM card to cooperate and work with any mobile equipment ME that supports these functions. Features that can be utilized in implementations of the present invention include Proactive SIM—which provides mechanisms by means of which, upon initialization of the SIM card, the mobile equipment performs certain functions such as sending a message or a maximum of 160 characters from the SIM card and displaying the message or characters, and sending a USSD (Unstructured Supplemental Service Data) string to the network. An important feature in respect of the present invention is the Call Control by SIM function, as described in section 9 of the specification. When this function has been activated on the SIM card, the mobile equipment ME will perform the following functions:

During each call attempt, the mobile equipment transfers the numbers dialed by the user as well as the associated parameters to the SIM card. The only exception is a redial attempt, in which only certain details of call setup are transferred to the SIM card.

The SIM card generates a predetermined response to the mobile equipment, in accordance with which the mobile equipment either initiates call setup using with the numbers dialed by the user, does not initiate call setup at all, or uses the data provided by the SIM in the call setup procedure.

If an extra service function is enabled or in use, the mobile equipment ME transfers a service control string to the SIM card before the service is implemented.

The SIM card gives the mobile equipment a response of the same type as in the case of dialed numbers, whereupon the mobile equipment either does or does not start the service, or starts the service in accordance with instructions provided by the SIM card.

In addition, section 6.4.15 of the Phase 2+ specifications define the command PROVIDE LOCAL INFORMATION which the SIM card can use to request that the mobile equipment send or transmit current location information. When the SIM card issues this command to the mobile equipment, the latter responds by giving a TERMINAL RESPONSE which contains the Mobile Country Code MCC, Mobile Network Code MNC, Location Area Identifier LAI, and the Cell Identity code CI.

The Phase 2+ specifications additionally define the command DISPLAY TEXT. By outputting this command, the SIM card can cause the mobile equipment to display a desired text on the equipment display.

Figure 4:
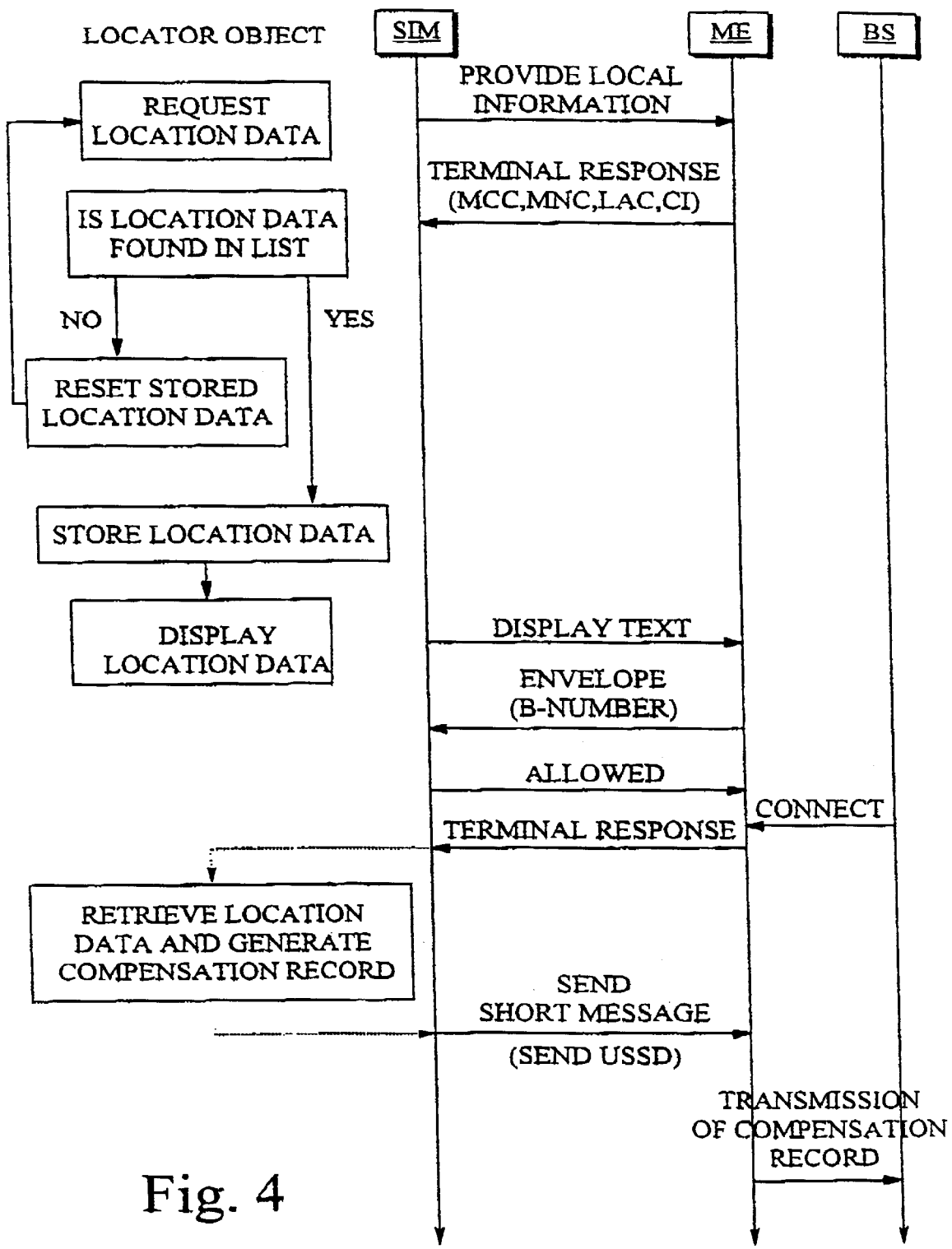
FIG. 4 presents a flow and signaling diagram illustrating the procedure of the present invention as applied to a prior art mobile telephone system.

These new features and functionality of the SIM-ME interface, as defined in the Phase 2+ system specifications, are preferably utilized in the implementation of the present invention. The operation of the locator object will now be described using the concepts mentioned above and with reference to FIG. 4 which depicts the functioning of the locator object and the exchange of messages between the SIM card, the mobile equipment ME, and the base transceiver station BTS.

The locator object, which as generally contemplated takes the form of a computer software program, is implemented or stored on the SIM card. At regular time intervals $\Delta T$, the locator object sends a PROVIDE LOCAL INFORMATION message to the mobile equipment ME. In response to this message, the mobile equipment sends a TERMINAL RESPONSE message which contains the mobile country code MCC, mobile network code MOBILE NETWORK CODE MNC, location area code LAC, and the cell identity code CI (i.e. Cell Id). Assume, for purposes of illustrative explanation, that the object uses the cell identity code CI as location data. Upon receipt of the message, the locator object checks whether the cell identity code is included in the cell list that is stored on the SIM card. This list has been pre-stored on the card by the network operator. If the cell identity code it is not found in the stored list, then the cell identity data last saved is reset and, after the set time interval $\Delta T$, the locator object sends a new request for location data and again compares the received cell identity code with the stored list. On the other hand, a match of the cell identity code with the data in the stored list indicates that the mobile equipment has received location data from the BCCH carrier while in a cell for which the operator has set a special charging rate for calls originated from that cell. In the latter case, the location data is stored to memory and, again, after an interval of $\Delta T$ a request for location data is sent and the above-described procedure is repeated. If the newly-received cell identity code is not found in the list, then the previously stored cell identity code is reset.

When the location data has been stored, the locator object sends a DISPLAY TEXT message to the mobile equipment, which then displays the cell identity code included in the message either as in its actual form or in a plain-language format, e.g. as the text "Reduced call charge" or the like.

When the user dials a telephone number to make a call, the mobile equipment transfers the called number dialed by the user in an ENVELOPE message to the SIM card. If the locator object accepts the number, it sends an ALLOWED acknowledgement message Call setup then proceeds in the normal manner and ends with a CONNECT message sent by the network, whereupon a speech path is connected between the called and calling stations. In response to the CONNECT message, the mobile equipment sends a TERMINAL RESPONSE message to the SIM card, letting the locator object know that the speech path has been connected.

The locator object now retrieves the location data from the data storage. If that data is not zero—a zero denoting "not a special rate cell" —the locator object will start generating a compensation record by placing in the record the location data and call identification data specifying the call so that the billing object will be able to link together the compensation record and the call data record generated by the mobile switching center. The call identification data may include at least a running sequence number N, which is reset when it reaches a maximum value M; the sequence number thus changes as moduloM. Each successful call is thus assigned a sequence number but, since a compensation record is not generated for every call, the locator object will receive from each of the mobile stations compensation records with a sequence number N that does not regularly or consistently increment. For this reason, the mobile switching center may be provided with a function that adds to the call data record a sequence number N increasing moduloM in the same manner. As a consequence of this arrangement, the billing object will be able to link the compensation records with call data records having the same N value and charge the customer on the basis of the location data given in the compensation record. Of course, it is also within the intended scope and contemplation of the invention to include the calling and called numbers in the compensation record.

During the call, the locator object transfers the compensation record to the mobile equipment, which in turn sends it over the network to the billing object during the call. This transmission can also be effected in the form of a short message SMS (Short Message Service), in which case the locator object will give the mobile equipment a Send SMS command or, using the USSD (Unstructured Supplementary Service Data) in accordance with the GSM standard, a Send USSD command.

In the foregoing description, the compensation record was sent during the call. In an alternative implementation, the locator object may collect compensation records for an extended period of time or number of calls and then send them to the billing object in a larger batch. The batch size limit is set by the maximum length of the short message, which is 160 characters. Transmission of the batch can be performed in the same way as the transmission of a compensation record during a call. If, however the compensation records are sent not during each call but periodically in larger batches, there is a risk that the compensation records associated with at least some of the calls might be received after the close of the actual billing period. This would raise significant operating difficulties because it would then be necessary to send credit notes to the affected customers and, therefore, real-time transmission of compensation records is the preferred alternative.

In either case, the billing object gathers together the call data records sent by the mobile switching center and the compensation records sent by the locator object and identifies those of the call data records which, according to the compensation records, are entitled to a different (lower) call charge, even if the cell identity code in the call data record indicates that the call is a normal rate call. If the billing object cannot match a call data record produced by the mobile switching center with a compensation record produced by the locator object, then it will assume that the call has been made in a normal rate area.

For transmission of the compensation records to the billing object, a reliable data transmission link must be available between the objects. The SMS and USSD functions utilized in the GSM system are sufficiently reliable for that purpose.

Those skilled in the art with knowledge of this disclosure will recognize and appreciate that the present invention is not intended to be and should not be restricted to the particular embodiments and examples hereinabove described or presented, and that many different embodiments and modifications are contemplated and properly within the scope of this disclosure. For example, the locator object may be integrally implemented in the mobile equipment while only the list of special cells is stored by the operator on the SIM card.

In addition to the cell identity code CI, the data used as the location data may comprise or consist of the mobile country code MCC, the mobile network code MNC, the location area code LAC, or some combination thereof. In CDMA systems, the base station pilot signal data can be used as the location data because each base station continuously or repeatedly transmits its own individual pilot signal. If the mobile communication system comprises—for example where required by the supervising or responsible authorities—a feature for calculating the location of the mobile station using timing advance values or some other method, then this information is transmitted, e.g. in the form of coordinates to the locator object In this case, the locator object can be provided with tables of special location areas, whose boundaries need not coincide with cell area boundaries. The tables may contain, for example, coordinate values so that the locator object compares the current location data with the table data to establish whether the current location is within one of the special areas. The mobile station may also be provided with a location system such as a GPS receiver, in which case the locator object compares the coordinate values obtained from the GPS system with the table values and proceeds as above.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method of determining a call charge rate to be applied in a cellular mobile telephone network covering a plurality of coverage areas and that includes a mobile switching center that produces a call data record for each call, and a plurality of base transceiver stations that each transmits the calls of subscriber mobile stations located in the coverage areas served by the each base transceiver station, wherein at least one of the coverage areas is designated a special area in which a special charge rate is applied to calls originating from the special area, and wherein each of the mobile stations comprises mobile equipment, receives and sorts by relative signal strength received base station broadcast signals, decodes from at least a strongest of the sorted broadcast signals the base transceiver station identifying data, and repeatedly determines its current location at a first predetermined time interval, said method comprising the steps of:

storing a list of location identifiers denoting the designated at least one special area in each of the mobile stations;

comparing in each mobile station, with each determination of the current location of the each mobile station, the determined location with the stored list of location identifiers to determine whether the each mobile station is currently located in the designated at least one special area;

storing in a memory of the each mobile station for the first predetermined time interval, where it is determined that the each mobile station is currently located in the designated at least one special area, location data for the determined location;

generating during a call originating from the each mobile station, where the originating call is initiated from the each mobile station while the location data is stored in the memory, a compensation record associated with the originating call and comprising the location data and data identifying the originating call;

transmitting the generated compensation record from the each mobile station to the mobile telephone network;

combining, in the mobile telephone network, data in the transmitted compensation record received from the each mobile station for the originating call with data in the call data record for the originating call to determine a proper call charge rate to be applied to the originating call; and sending to the mobile equipment a Provide Local Information message at a second predetermined time interval and, in response to a Terminal Response return message, to determine whether the decoded base transceiver station identifier data is included in the stored list.

2. A method in accordance with claim 1, wherein the determination by each of the mobile stations of the current location of the each mobile station is effected using identifier data transmitted by the mobile telephone network.

3. A method in accordance with claim 1, wherein the determination by each of the mobile stations of the current location of the each mobile station is effected using data transmitted by a system external to the mobile telephone network.

4. A method in accordance with claim 3, wherein the external system is a satellite positioning system.

5. A method in accordance with claim 1, wherein said data identifying the originating call comprises an identical parameter included in both the compensation record and the call data record for the originating call.

6. A method for improved determination of a call charge rate to be applied in a cellular mobile telephone network covering a plurality of coverage areas and that includes a plurality of base transceiver stations each serving at least one of the plural coverage areas and a plurality of subscriber mobile stations, wherein each of the mobile stations comprises mobile equipment, sorts, by signal strength, broadcast signals received from the plural base transceiver stations and decodes from at least a strongest of the sorted broadcast signals base transceiver station identifying data, wherein at least one of the coverage areas is designated a special area in which a special charge rate is applied to calls originating from the special area, and wherein each of the mobile stations repeatedly determines its current location at a first predetermined time interval, said method comprising the steps of:

storing a list of the designated at least one special area in each of the mobile stations;

determining at the mobile station, with each determination of the current location of the each mobile station, whether the mobile station is currently located in the designated at least one special area;

storing in a memory of the each mobile station for the first predetermined time interval, where it is determined that the each mobile station is currently located in the designated at least one special area, location data for the determined current location;

generating during a call originating from the each mobile station, where the originating call is initiated from the each mobile station while the location data is stored in the memory, a compensation record associated with the originating call and comprising the location data and data identifying the originating call;

transmitting the generated compensation record from the each mobile station to the mobile telephone network; and sending to the mobile equipment a Provide Local Information message at a second predetermined time interval and, in response to a Terminal Response return message, to determine whether the decoded base transceiver station identifier data is included in the stored list.

7. A method in accordance with claim 6, further comprising the step of displaying on a display of the each mobile station, when the location data for the determined current location is stored in the memory of the each mobile station, information indicating that the mobile station is located in the at least one special area.

8. A method in accordance with claim 6, wherein an interval of repetition at which the mobile station decodes the at least the strongest of the sorted broadcast signals being longer than the predetermined time interval.

9. A method in accordance with claim 6, wherein the at least one special area comprises at least one cell of a plurality of cells covered by the mobile telephone network, and wherein the stored list of the designated at least one special area comprises identifiers of the at least one cell of the at least one special area.

10. A method in accordance with claim 6, wherein the generated compensation record from the each mobile station to the mobile telephone network is transmitted during the originating call.

11. A method in accordance with claim 6, wherein said transmitting step comprises the steps of:

collecting a plurality of compensation records each associated with a different originating call from the each mobile station into a batch; and transmitting the batch of compensation records from the each mobile station to the mobile telephone network.

12. A method in accordance with claim 6 and wherein the mobile telephone network includes a mobile switching center that produces a call data record for each call in the network, further comprising the steps of:

comparing in the mobile telephone network the call data records generating by the mobile switching center with the transmitted compensation records received by the mobile telephone network; and calculating charges for a particular call in the mobile telephone network, when said comparison locates both a call data record and a compensation record for the particular call, on the basis of the special charge rate for the special area.

13. A method in accordance with claim 6, wherein said storing of the list of the designated at least one special area comprises storing the list in a Subscriber Identity Module of the each mobile station.

14. In a cellular mobile telephone system covering a plurality of coverage areas and that includes a mobile switching center for producing a call data record for each call in the system, a plurality of base transceiver stations each operable for transmitting identifier data for said each base transceiver station in a broadcast signal, and a plurality of subscriber mobile stations each comprising a mobile equipment and a subscriber identity module connected to the mobile equipment, each said mobile station being operable for receiving and sorting by relative signal strength the received base transceiver station broadcast signals and for decoding from at least a strongest of the sorted broadcast signals the base transceiver station identifying data, and wherein at least one of the coverage areas is designated a special area in which a special charge rate is applied to calls originating from the special area, an apparatus for assuring proper billing of charges to subscribers for calls in the cellular mobile telephone system, comprising:

memory in each said mobile station storing a list comprising data identifying the at least one of the coverage areas designated a special area;

a locator object in each said mobile station for:
- (i) repeatedly determining at predetermined time intervals a current location of the said each mobile station;
- (ii) comparing the determined current location with the data in the stored list to determine whether the said each mobile station is currently located in the at least one of the coverage areas designated a special area;
- (iii) storing in the memory said each mobile station for the predetermined time interval, where it is determined that the said each mobile station is currently located in the at least one of the coverage areas designated a special area, location data for the determined current location;
- (iv) generating during a call originating from said each mobile station, where the originating call is intitiated from said each mobile station while the location data is stored in the memory, a compensation record associated with the originating call and comprising the location data and data identifying the originating call; and
- (v) transmitting the generated compensation record from said each mobile station to the mobile telephone system, said locator object being further operable for sending to the mobile equipment a Provide Local Information message at time intervals of a second predetermined length and, in response to a Terminal Response return message, for determining whether the decoded base transceiver station identifier data is included in the stored list;

an interface included in each of said plural mobile stations conforming to GSM system specification 11.14 between the mobile equipment and the subscriber identity module; and a billing object operable for comparing the transmitted compensation records received from the mobile stations with the call data records generated by the mobile switching center and, when a compensation record is located for a call data record identifying a particular call, generating a call charge using the special charge rate for the special area identified by the located compensation record.

15. In the cellular mobile telephone system of claim 14, said locator object being located in the subscriber identity module of said each mobile station and said billing object being located in a billing center of the telephone system.

16. In the cellular mobile telephone system of claim 14, said locator object being further operable to send to the mobile equipment of the said each mobile station, when the decoded identifier data is determined to be included in the stored list, a Display Text message to cause the mobile equipment to display the identifier data on a display screen of said each mobile station.

17. In the cellular mobile telephone system of claim 14, said locator object being operable to generate the compensation record in response to a message sent to the subscriber identity module indicating establishment of a speech connection of the originating call.

18. In the cellular mobile telephone system of claim 14, said locator object being operable to transmit the generated compensation record by sending to the mobile equipment of said each mobile station a Send Short Message message to thereby cause the mobile equipment of s aid each mobile station to transmit the generated compensation record to said billing object.

19. In the cellular mobile telephone system of claim 14, said locator object being operable to transmit the generated compensation record by sending to the mobile equipment of said each mobile station a Send USSD message to thereby cause the mobile equipment of said each mobile station to transmit the generated compensation record to said billing object.

* * * * *